May 4, 1965  J. W. DE VITT ETAL  3,181,483
SERVING TRAY

Filed Nov. 6, 1963  2 Sheets-Sheet 1

INVENTORS

May 4, 1965  J. W. DE VITT ETAL  3,181,483

SERVING TRAY

Filed Nov. 6, 1963  2 Sheets-Sheet 2

INVENTORS
John W. De Vitt
Kenneth E. Jones

3,181,483
SERVING TRAY
John W. Devitt and Kenneth E. Jones, both % Claremont P.O., Claremont, Ontario, Canada
Filed Nov. 6, 1963, Ser. No. 321,825
4 Claims. (Cl. 108—25)

This invention relates to improvements in serving trays which may be utilized in automobiles for serving food and beverages, and which may also be utilized in automobiles for the purpose of a writing desk, map carrier and the like.

It is conventional practice to provide trays and other support surfaces within an automobile for the purpose of holding food and drink for the convenience of the occupants. Many disadvantages attend such methods as have been hitherto available for providing serving areas within automobiles. Thus, one prior type of device provides four legs extending from the corners of a supporting tray, the legs being meant to rest on the floor of the automobile. It will be appreciated that since the floor of an automobile is not normally flat or straight, the serving surface quite often slopes to a degree which renders it ineffective for the purpose intended.

Still other types of prior trays are intended to be permanently secured in position within the automobile where they may be ready for use at any time. A serious disadvantage with such a method is the fact that such a tray is very often difficult to clean within the automobile.

Still other disadvantages are found with certain other types of prior trays, especially those which are intended to be placed on the exterior portions of the automobile. Thus one common type of serving tray has hook means thereon whereby the tray is intended to be secured to the open window of an automobile and supported thereon. This has the disadvantage of tending to mar the surface finish on the side to which the device is attached as well as having the disadvantage of often being very awkward to serve from.

Accordingly, it is an object of the present invention to provide a serving tray having support means especially adapted for use on an automobile floor whereby the serving tray is supported horizontally at all times.

It is a further object of this invention to provide a serving tray which may be easily removed from the automobile for the purposes of cleaning, and which may be easily reinstalled whenever required.

It is a still further object of this invention to provide a serving tray which may be used as a tray for serving foods and the like, and may also be used as a writing surface or a map supporting surface.

It is yet another object of this invention to provide a serving tray which is solely supported by the floor of the automobile and thus can in no way damage the interior or exterior surfaces thereof.

These and other objects and features of this invention will become apparent from the following detailed description and accompanying drawings in which like numerals refer to like parts.

Figure 1:
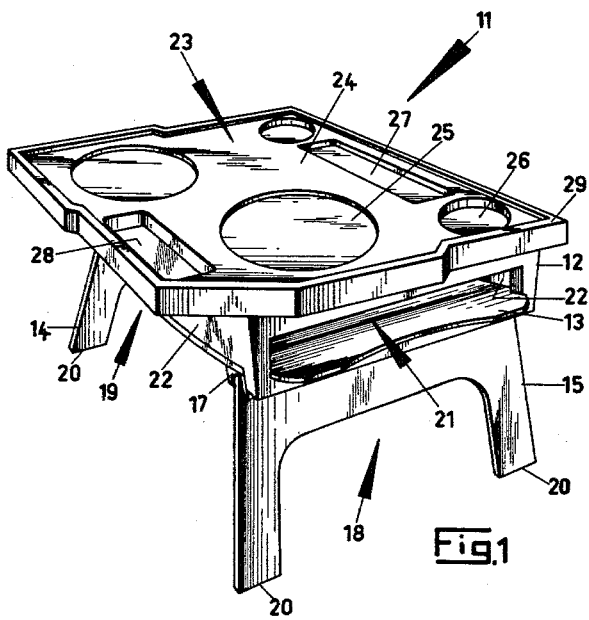
FIG. 1 is a perspective view of a presently preferred embodiment of this invention.

Having reference to FIG. 1, a serving tray indicated generally as 11 is illustrated and comprises a frame 12 having a substantially rectangular configuration. Frame 12 is provided with a shelf 13 secured by two edges of frame 12 and supported subjacent thereto. Shelf 13 is preferably curved in one direction as illustrated in the drawings, whereby articles such as maps, magazines, and the like will normally tend to move to the center of the shelf 13 due to movement of the automobile. Also the curved surface of shelf 13 aids in maintaining the articles thereon while an automobile is in motion around a curve.

A pair of legs 14 and 15 are secured between rails 16 and 17 to the undersurface of shelf 13. Legs 14 and 15 extend outwardly of each other to provide a passageway therebetween. Cut-outs as indicated at 18 and 19 are provided in legs 14 and 15 whereby supporting surfaces 20 are supplied at each corner of the tray 11.

Frame 12 is provided with a cut-out indicated at 21 on each side thereof whereby access is provided to the shelf 13. It is also preferable to provide sides 22 on frame 12 whereby articles placed on shelf 13 are prevented from being dislodged by the action of centrifugal force as an automobile rounds a corner.

The tray indicated as 23 is removably placed on frame 12 and comprises a serving surface 24 having a number of receptacles in the surface thereof. The receptacles as provided in the surface 24 may be shaped for various types of food vessels. Thus, receptacles 25 may be utilized for securing a plate to surface 24, receptacle 26 may be used for securing a glass or cup, and a receptacle 27 may be used for eating utensils such as forks and spoons.

A cut-out 28 is provided in the surface 24 whereby a refuse container may be supported below the cut-out 28, the refuse from the meal thereby being easily disposed of. A rib 29 is provided above the periphery of tray 23 said rib aiding in maintaining articles on the surface 24 and also aiding in maintaining tray 23 on frame 12 when the tray 23 is reversed.

Figure 2:
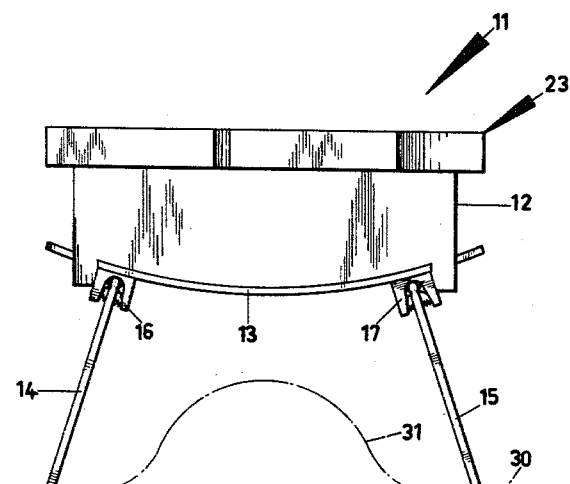
FIG. 2 is an end elevation of the embodiment as illustrated in FIG. 1 and particularly shows the application of the serving tray to the automobile floor.

Referring to FIG. 2, the serving tray 11 is illustrated as supported on an automobile floor 30. In this illustration the transmission hump 31 on floor 30 is shown located between legs 14 and 15. It will be seen that the passageway between the legs is convenient since the serving tray may be supported on a floor 30 without being influenced by the transmission hump 31.

Figure 3:
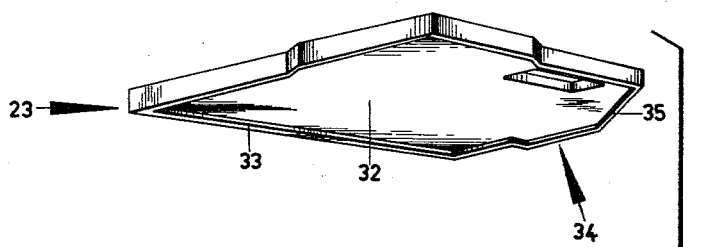
FIG. 3 is a perspective view of the serving tray and shows the tray portion removed from the lower portion, and reversed whereby the writing surface is viewed.

Referring to FIG. 3, the serving tray 23 is shown reversed and removed from the frame 12. It will be seen that the undersurface 32 of tray 23 may be utilized as a writing surface or for the support of maps and the like. As before, a rib 33 is provided above the periphery of surface 32 with 33 aiding in maintaining articles on said surface as well as maintaining tray 23 in position when reversed as shown in FIG. 1.

As illustrated in the drawings the sides of tray 23 are sloped inwardly towards a narrow end indicated generally as 34 the slope of the sides allowing free movement of the driver and passenger while the serving tray is installed on the floor. To this end a beveled edge indicated as 35 is provided on one corner of tray 23, this edge 35 allowing free movement of the driver's foot for the proper operation of gas and brake controls.

Figure 4:
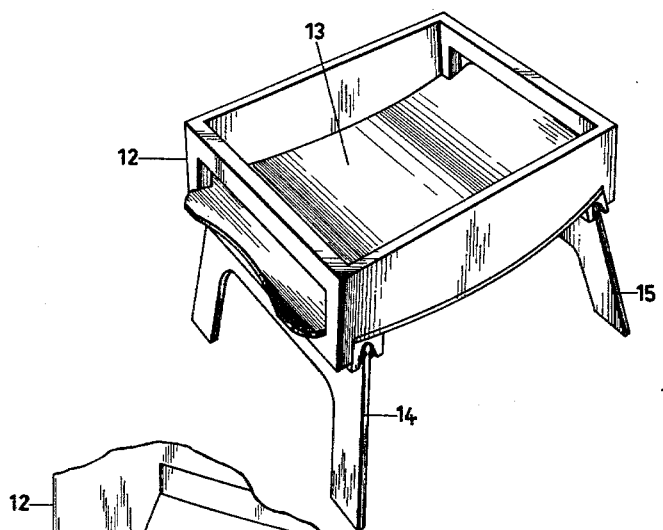
FIG. 4 is an enlarged view of the method of securing the legs to the serving tray.
Figure 4:
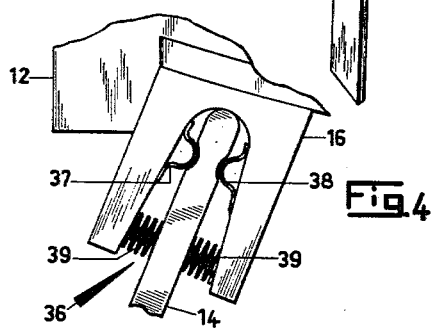

Referring to FIG. 4, a method of supporting the legs to the frame is illustrated and shows one of the rails 16 secured to the frame 12. Since the attachment of both legs 14 and 15 is similar, only the attachment of the leg 14 will be illustrated here, the same remarks being true for attachment of the leg 15.

Rail 16 is provided with a slot indicated as 36 into which the leg 14 is placed. A pair of spring members 37 and 38 are secured within the slot 36 at the upper end thereof and extend substantially the full length of the rail 16. A plurality of coil springs 39 are located within slot 36 at the lower end thereof, springs 39 extending in side by side relationship substantially the full length of a slot 36.

Leg 14 is inserted between the springs 39 and is gripped by the members 37 and 38 to be held within the slot 36. The springs 39 allow movement of the leg 14 while the spring members 37 and 38 retain leg 14 within the slot 36.

The spring 39 tends to provide a neutral position for leg 14 the same being true for the leg 15, whereby the distance between the legs 14 and 15 are maintained in a normal neutral position. However, upon the serving tray being placed over the transmission hump of an automobile the legs are forced slightly apart whereby the lower edges 20 of the legs grip the floor of the car thus preventing movement of the serving tray while the car is in motion.

In use, the serving tray may be installed on the floor of an automobile and in the case where a transmission hump is evident the legs will straddle said hump to firmly grip either side thereof. The serving tray may be placed on the frame of the device in either one of two positions whereby the tray may be used for serving food and drink or may be used as a writing or map supporting surface. It should also be noted that the tray may be dispensed with and the frame 12 together with shelf 13 being utilized as a carrier for various articles.

It will further be seen that the serving tray may easily be removed from the automobile for the purpose of cleaning and storage, and that the tray may be easily washed as a separate unit. This is of advantage in some cases where it is desirable to leave the main portion of the tray within the automobile, the serving tray surface being removed and cleaned separately.

From the foregoing it will be seen that the present invention comprises a supporting frame having a pair of legs resiliently secured thereto and extending therefrom to define a passage therebetween, and a serving tray removably mounted on said frame, said tray defining a number of receptacles therein for supporting and securing articles thereto.

It will be further understood that although specific embodiments of this invention have herein been described and illustrated, the invention also contemplates such variations in design as may fall within the scope of the following claims.

The embodiments of this invention in which an exclusive property or privilege is claimed are defined as follows:

1. A serving tray comprising a supporting frame; a shelf secured subjacent to said frame; a pair of rails secured to said frame, subjacent thereto and to two sides thereof, each said rail defining a downwardly facing slot therealong; resilient gripping members secured within said slot at the upper end thereof, and adapted to releasably grip the upper edge of said leg placed within said slot; a plurality of compression springs secured within said slot and extending in side by side relationship substantially the length of said slot, thereby to bias said leg in a neutral position both of said legs thereby providing gripping means for said serving tray; a reversible serving tray removably placed on said frame and supported thereby; and means for defining receptacles in the surface of said tray, whereby food vessels and utensils may be located thereon.

2. A serving tray comprising a supporting frame; a shelf secured subjacent to said frame; a pair of rails secured to said frame, subjacent thereto and to two sides thereof, each said rail defining a downwardly facing slot therealong; resilient gripping members secured within said slot at the upper end thereof, and adapted to releasably grip the upper edge of said leg placed within said slot; a plurality of compression springs secured within said slot and extending in side by side relationship substantially the length of said slot, thereby to bias said leg in a neutral position both of said legs thereby providing gripping means for said serving tray; a reversible serving tray removably placed on said frame and supported thereby; means for preventing lateral movement of said tray on said supporting frame; and means for defining receptacles in the surface of said tray, whereby food vessels and utensils may be located thereon.

3. A serving tray for use in automobiles for holding food and the like, and comprising a supporting frame having a rectangular configuration; a pair of rails secured to said frame, subjacent thereto and to two sides thereof, each said rail defining a downwardly facing slot therealong; resilient gripping members secured within said slot at the upper end thereof, and adapted to grip the upper edge of said leg placed within said slot; a plurality of compression springs secured within said slot and extending in side by side relationship substantially the length of said slot, thereby to bias said leg in a neutral position both of said legs thereby providing gripping means for said serving tray; a reversible serving tray removably placed on said frame and supported thereby; and means for preventing lateral movement of said tray on said supporting frame.

4. A serving tray for use in automobiles for holding food and the like, and comprising a supporting frame having a rectangular configuration; a shelf secured to said frame, said shelf being curved upwardly to the secured ends, whereby articles placed thereon will tend to center on said shelf due to motion of said automobile; a pair of rails secured to said frame, subjacent thereto and to two sides thereof, each said rail defining a downwardly facing slot therealong; resilient gripping members secured within said slot at the upper end thereof, and adapted to releasably grip the upper edge of said leg placed within said slot; a plurality of compression springs secured within said slot and extending in side by side relationship substantially the length of said slot, thereby to bias said leg in a neutral position both of said legs thereby providing gripping means for said serving tray; a reversible serving tray removably placed on said frame and supported thereby; a raised rib extending about the perimeter of said tray on both sides thereof, whereby upon said tray being supported by said frame, said rib prevents lateral movement of said tray; and means for defining receptacles in the surface of said tray, whereby food vessels and utensils may be located thereon.

References Cited by the Examiner
UNITED STATES PATENTS

| | | | |
|---|---|---|---|
| 2,546,812 | 3/51 | Anderson | 108—25 |
| 2,727,754 | 12/55 | Webb | 108—27 X |
| 2,837,388 | 6/58 | Majeroni et al. | 108—25 |
| 2,897,974 | 8/59 | Cook | 211—74 |
| 2,969,900 | 1/61 | Heuler | 108—44 |
| 2,986,438 | 5/61 | Smathers | 108—116 |
| 3,048,457 | 8/62 | Haase | 108—44 |
| 3,088,421 | 5/63 | Ferris | 108—13 |

FRANK B. SHERRY, *Primary Examiner.*